(12) United States Patent
Johnson

(10) Patent No.: US 10,716,297 B2
(45) Date of Patent: Jul. 21, 2020

(54) AUTOMATIC FISH FEEDER

(71) Applicant: Clarence Johnson, Richfield, MN (US)

(72) Inventor: Clarence Johnson, Richfield, MN (US)

( * ) Notice: Subject to any disclaimer, the term of this patent is extended or adjusted under 35 U.S.C. 154(b) by 205 days.

(21) Appl. No.: 15/906,659

(22) Filed: Feb. 27, 2018

(65) Prior Publication Data
US 2018/0242561 A1 Aug. 30, 2018

Related U.S. Application Data

(60) Provisional application No. 62/600,684, filed on Feb. 28, 2017.

(51) Int. Cl.
*A01K 61/00* (2017.01)
*A01K 61/85* (2017.01)

(52) U.S. Cl.
CPC ............. *A01K 61/85* (2017.01); *Y02A 40/845* (2018.01)

(58) Field of Classification Search
CPC .... A01K 61/85; A01K 5/0291; A01K 5/0275; A01K 5/02; A01K 61/80
USPC ...................... 119/51.04, 51.11, 51.13, 57.92
See application file for complete search history.

(56) References Cited

U.S. PATENT DOCUMENTS

| | | | | |
|---|---|---|---|---|
| 2,772,659 A | * | 12/1956 | Tennis | .................... A01K 61/85 |
| | | | | 119/51.04 |
| 2,785,831 A | * | 3/1957 | Smolin | .................. A01K 61/85 |
| | | | | 222/650 |
| 3,050,029 A | | 8/1962 | Appleton | |
| 3,156,214 A | | 11/1964 | Denney et al. | |
| 3,688,744 A | * | 9/1972 | Kaplan | .................. A01K 61/85 |
| | | | | 119/51.11 |

(Continued)

FOREIGN PATENT DOCUMENTS

| CA | 2757340 C | 8/2016 |
|---|---|---|
| GB | 952763 A | 3/1964 |

(Continued)

OTHER PUBLICATIONS

Hydor Ekomixo Digital Aquarium Feeder, 6" L X 2" W X 2.5" H, Retrieved online from <https://www.petco.com/shop/en/petcostore/product/fish/feeding-accessories/hydor-ekomixo-digital-aquarium-feeder> on Feb. 27, 2018, 5 pages.

(Continued)

*Primary Examiner* — Yvonne R Abbott-Lewis
(74) *Attorney, Agent, or Firm* — Fredrikson & Byron, P.A.

(57) ABSTRACT

Apparatus and methods for automatically feeding fish at predetermined intervals are disclosed herein. An automatic fish feeder can include a housing, at least one cover, a feeding track, and a valve. The housing can include a peripheral outer cover and at least one access hole. The food storage reservoir can be connected to the housing and configured to be accessible by an access hole. At least one cover can be removably attached to the peripheral outer cover and substantially seal the food storage reservoir. The feeding track can be coupleable to the food storage reservoir and configured to receive and distribute food from the food storage reservoir at individual rates. The valve can be coupleable to the feeding track and configured to control the flow of food from the feeding track. The valve can include a rod and a counter configured to move the rod relative to the feeding track.

20 Claims, 5 Drawing Sheets

(56) References Cited

U.S. PATENT DOCUMENTS

| | | | |
|---|---|---|---|
| 3,717,125 A * | 2/1973 | Sanders | A01K 61/85 119/51.11 |
| 3,741,162 A * | 6/1973 | Lopez | A01K 5/0291 119/51.13 |
| 3,742,912 A | 7/1973 | Chen et al. | |
| 3,762,373 A * | 10/1973 | Grossman | A01K 5/0291 119/51.11 |
| 4,089,299 A | 5/1978 | Suchowski | |
| 4,526,134 A * | 7/1985 | Sapp | A01K 61/85 119/51.13 |
| 4,722,300 A | 2/1988 | Walker et al. | |
| 4,981,106 A * | 1/1991 | Nagatomo | A01K 5/0275 119/51.11 |
| 5,133,292 A * | 7/1992 | Kirk | A01K 5/0291 119/51.04 |
| 5,337,698 A | 8/1994 | Widmyer | |
| 5,483,923 A | 1/1996 | Sabbara | |
| 5,791,285 A * | 8/1998 | Johnson | A01K 61/85 119/51.04 |
| 5,873,326 A | 2/1999 | Davet et al. | |
| 6,009,835 A * | 1/2000 | Boschert | A01K 61/85 119/51.04 |
| 6,082,299 A | 7/2000 | Halford | |
| 6,779,486 B2 | 8/2004 | Vaags | |
| 7,222,047 B2 | 5/2007 | McMillan et al. | |
| 7,500,447 B2 * | 3/2009 | Vaccari | A01K 61/85 119/51.04 |
| 9,241,478 B2 * | 1/2016 | Scott | A01K 5/0275 |
| 2005/0083786 A1 | 4/2005 | Tsai | |
| 2006/0063202 A1 | 3/2006 | Pieribone | |
| 2007/0219652 A1 | 9/2007 | McMillan | |
| 2007/0255431 A1 | 11/2007 | Kinsey | |
| 2014/0175001 A1 | 6/2014 | Willis, II | |
| 2017/0013810 A1 | 1/2017 | Graben et al. | |
| 2017/0105388 A1 | 4/2017 | Pfeiff | |
| 2017/0325427 A1 | 11/2017 | Straight et al. | |

FOREIGN PATENT DOCUMENTS

| | | |
|---|---|---|
| GB | 1351877 A | 5/1974 |
| WO | 0003586 A2 | 1/2000 |

OTHER PUBLICATIONS

Eheim Automatic Feeding Unit, Retrieved online from <https://www.petco.com/shop/en/petcostore/product/fish/feeding-accessories/eheim-automatic-feeding-unit> on Feb. 27, 2018, 5 pages.

Sera Feed a Plus Automatic Feeder, Retrieved online from <https://www.petco.com/shop/en/petcostore/product/fish/feeding-accessories/sera-feed-a-plus-automatic-feeder> on Feb. 27, 2018, 3 pages.

Imagitarium Automatic Fish Feeder, Retrieved online from <https://www.petco.com/shop/en/petcostore/product/fish/feeding-accessories/imagitarium-automatic-fish-feeder> on Feb. 27, 2018, 4 pages.

Fish Mate F14 Aquarium Fish Feeder, Retrieved online from <https://www.chewy.com/fish-mate-f14-aquarium-fish-feeder/dp/136180?utm_source=google-product&utm_medium=cpc&utm_campaign=hg&utm_content=Fish%20Mate&utm_term=&gclid=CjwKCAiAIL_UBRBoEiwAXKgW5xrnadamWtCXRxeZg3BwViqbVHKg1K5H254ly6eIPCXChrrbA_TKmBoC2SwQAvD_BwE&gclsrc=aw.ds> on Feb. 27, 2018, 7 pages.

EBoTrade Aquarium Tank Auto Fish Food Timer, Retrieved online from <https://www.amazon.com/Automatic-eBoTrade-Aquarium-Batteries-Included/dp/B07125LC1Y/ref=zg_bs_2975462011_4?_encoding=UTF8&psc=1&refRID=TYV0FYFH0HM16NJRJHSQ> on Feb. 27, 2018, 7 pages.

* cited by examiner

AUTOMATIC FISH FEEDER

TECHNICAL FIELD

The invention pertains to the field generally relating to automatic food delivery systems and methods, more particularly for feeding aquatic animals at an adjustable rate.

REFERENCE TO RELATED APPLICATIONS

This application claims an invention which was disclosed in Provisional Application No. 62/600,684, filed Feb. 28, 2017, entitled "Automatic Food Delivery Device". The benefit under 35 USC § 119(e) of the United States provisional application is hereby claimed, and the aforementioned application is hereby incorporated herein by reference.

BACKGROUND

In order to maintain an aquarium with aquatic plants and animals, the organisms need to be fed periodically. The length between feeding can vary widely depending on, for instance, the species and age of the animals. Maintaining a proper and reliable feeding schedule can be cumbersome, especially if the caretaker has other obligations, such as a full-time job, trips and vacations, emergencies, and the like. Such obligations can result in undesirably varied feeding schedules due to extended absences or just forgetting to feed the animals at all.

SUMMARY

In general, disclosed herein is an automatic feeder for feeding aquatic organisms, specifically fish, at predetermined intervals. Some traditional devices and methods for automatically feeding fish can have several external moving components which can pose a danger to the fish, the user, or a passerby for example. Other traditional devices and methods for automatically feeding fish require elaborate supporting structure which can be cumbersome, or they expose the food to the outside air before directing the food into the aquarium which can lead to contaminated food, unnecessary messes during operation, or unnecessary messes if there is some malfunction of the system. Additionally, traditional devices may not be able to direct food to locations beyond the immediate proximity of the device.

An automatic fish feeder as disclosed herein can provide several advantages. The automatic fish feeder can include a housing, a food storage reservoir, at least one cover, a feeding track, and a valve. The outer profile of the housing can be in the shape of an aquatic animal, for example, a fish. The food storage reservoir can be integrated into the housing and coupled to a feeding track. The feeding track can receive food from the food storage reservoir and, for instance, distribute the food into an aquarium. The feeding track can be connected to a valve, which can include a counter and a rod connected to the counter, for controlling the flow of food through the feeding track.

In operation, the automatic fish feeder can be easily prepped for use and can be positioned relative to an aquarium such as to facilitate the distribution of food. A user of the automatic fish feeder can fill the food storage reservoir with fish food, e.g., through an access hole in the housing. The automatic fish feeder can then be position such that gravity can assist in the distribution of the food. For instance, the automatic fish feeder can be positioned above a water level in an aquarium by attaching the automatic fish feeder to the wall of an aquarium using an adjuster coupled to the housing. The user can set the valve to distribute food at predetermined intervals using a valve, which includes a counter connected to a rod, connected to the feeding track. The rod can be configured to allow food to pass through the feeding track or not at certain positions corresponding to the predetermined intervals. Such illustrative devices and methods can eliminate the need for external moving parts, can be relatively easy to mount and relocate if necessary, can keep food from being exposed to air throughout the feeding process to prevent contamination and messes, and can direct food to different parts of the aquarium with the feeding track.

The details of one or more examples are set forth in the accompanying drawings and the description below. Other features, objects, and advantages will be apparent from the description and drawings, and from the claims.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1:
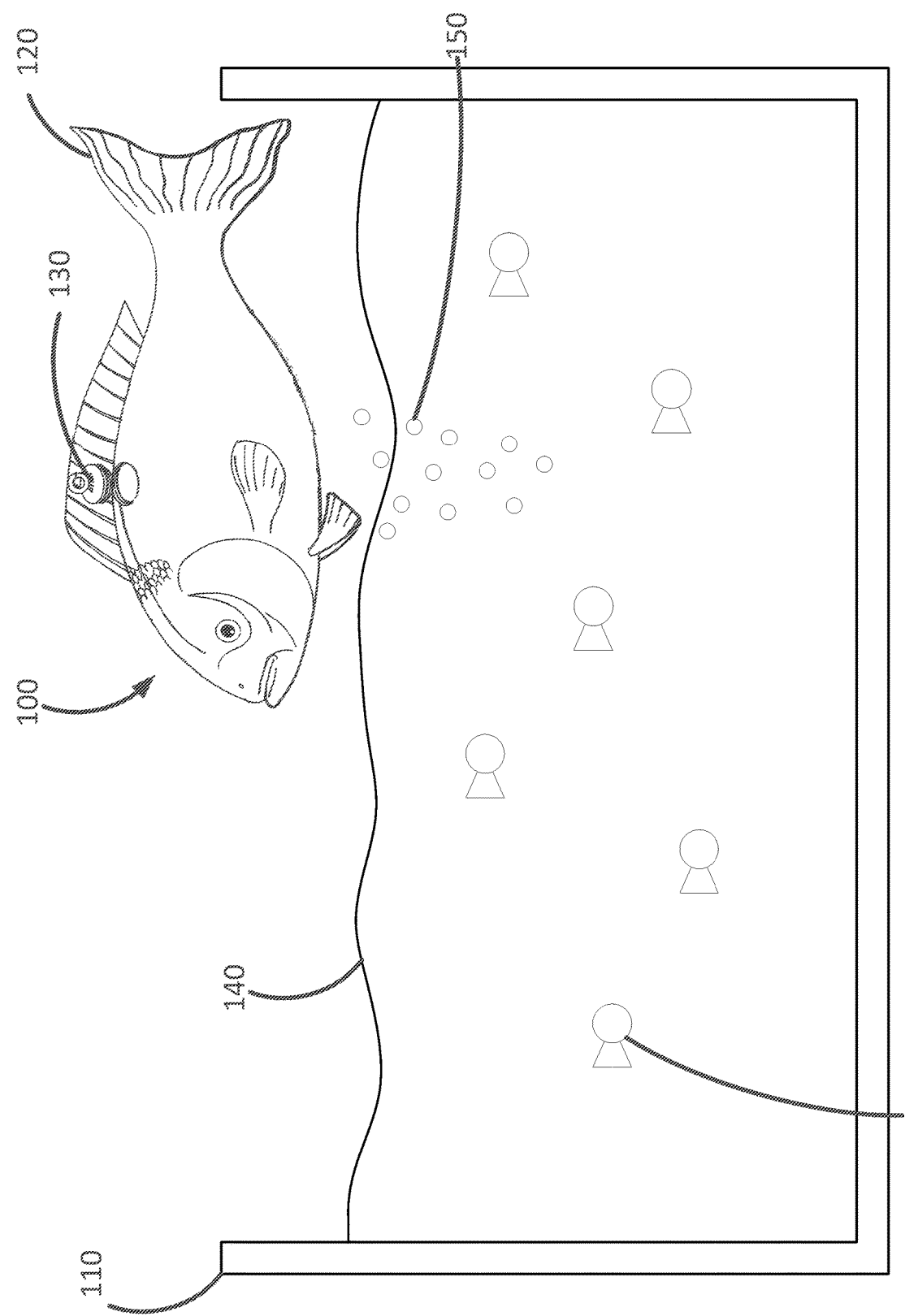
FIG. 1 is a schematic side elevational view of an illustrative automatic fish feeder in an aquarium.

An illustrative automatic fish feeder 100 can be used to feed fish 105 in an aquarium 110 as illustrated in FIG. 1. The automatic fish feeder 100 can include a housing 120, a food storage reservoir, at least one cover 130, a feeding track, and a valve. In some embodiments, the housing 120 can have an outer profile in the shape of a fish or another aquatic animal. The food storage reservoir can be preferably positioned within the housing 120, but may be positioned external to the housing. The fish feeder 100 can be positioned above the water 140 in the aquarium 110. The fish feeder 100 can distribute food 150 to the fish 105 at predetermined intervals of, e.g., time, quantity, or other measurable qualities. The fish feeder is preferably used for aquatic animals, but can have applications for feeding land-based animals, on small and industrial applications, as well.

Figure 2:
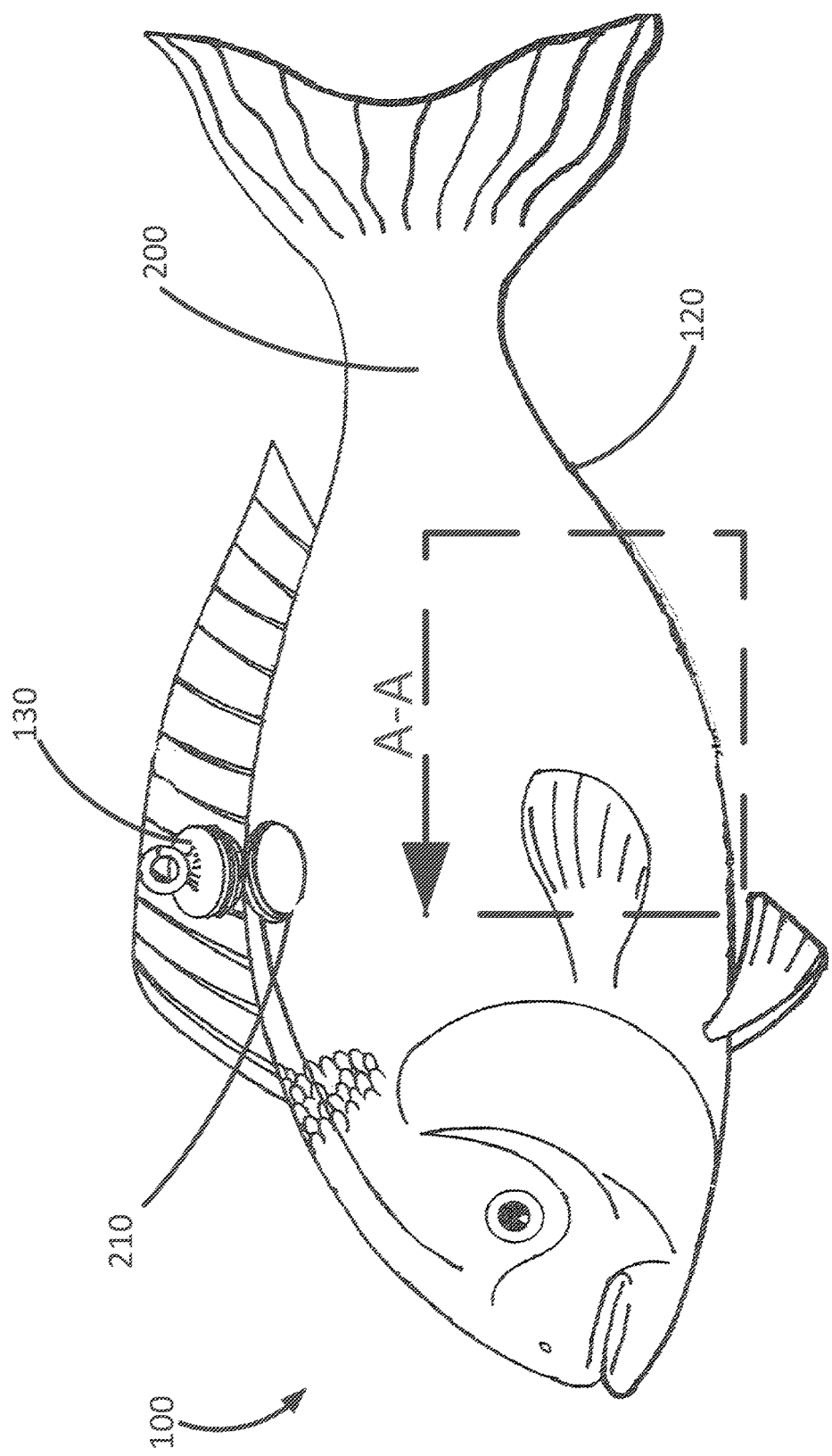
FIG. 2 is a perspective view of an illustrative automatic fish feeder.

The housing 120 can include several features for facilitating access to internal components of the fish feeder as shown in FIG. 2. For instance, when the food storage reservoir is located inside of the housing, filling the fish feeder 100 with food. The food can preferably be in granulated form, but may also be in other forms. The housing 120 can include a peripheral outer cover 200 and at least one access hole 210 in the peripheral outer cover 200. The peripheral outer cover 200 can have an inner surface and an outer surface. The housing can be integrally manufactured or composed of segmented pieces. As described elsewhere herein, access holes 210 in some embodiments can provide access to at least either or both of the food storage reservoir and a valve.

In many embodiments, food can be stored within the housing 120 of the fish feeder 100. The food storage reservoir can be positioned within the housing 120 and can be connected to the housing 120. The food storage reservoir can be configured to be accessible by at least one of the at least one access holes 210 in the peripheral outer cover 200 of the housing 120 and to hold and keep fresh any food. When the food is stored in the food storage reservoir, the housing 120 does not have to be airtight or watertight, which can reduce the weight of the fish feeder 100. In addition, when the food storage reservoir has notably less volume than the housing 120 (e.g., ¼, ⅓, ½, or ⅔ of the volume), the weight of the fish feeder 100 can be reduced. Such reductions in weight can, for example, reduce the amount of force placed on the glass where the fish feeder 100 mounts to an aquarium wall. In some embodiments, there may be more than one food storage reservoir capable of holding different types and amounts of food to deliver to the feeding track.

The covers 130 can seal off, protect, and provide access to certain components of the fish feeder. The at least one cover 130 can be removably attached to the peripheral outer cover 200 of the housing 120. At least one of the covers 130 can be configured to substantially seal the food storage reservoir. Another cover 130, for instance, can provide access to the valve for maintenance and operation. The covers 130 can have a member, e.g., a string, that keeps the cap at close proximity to the housing when it is removed.

Figure 3:
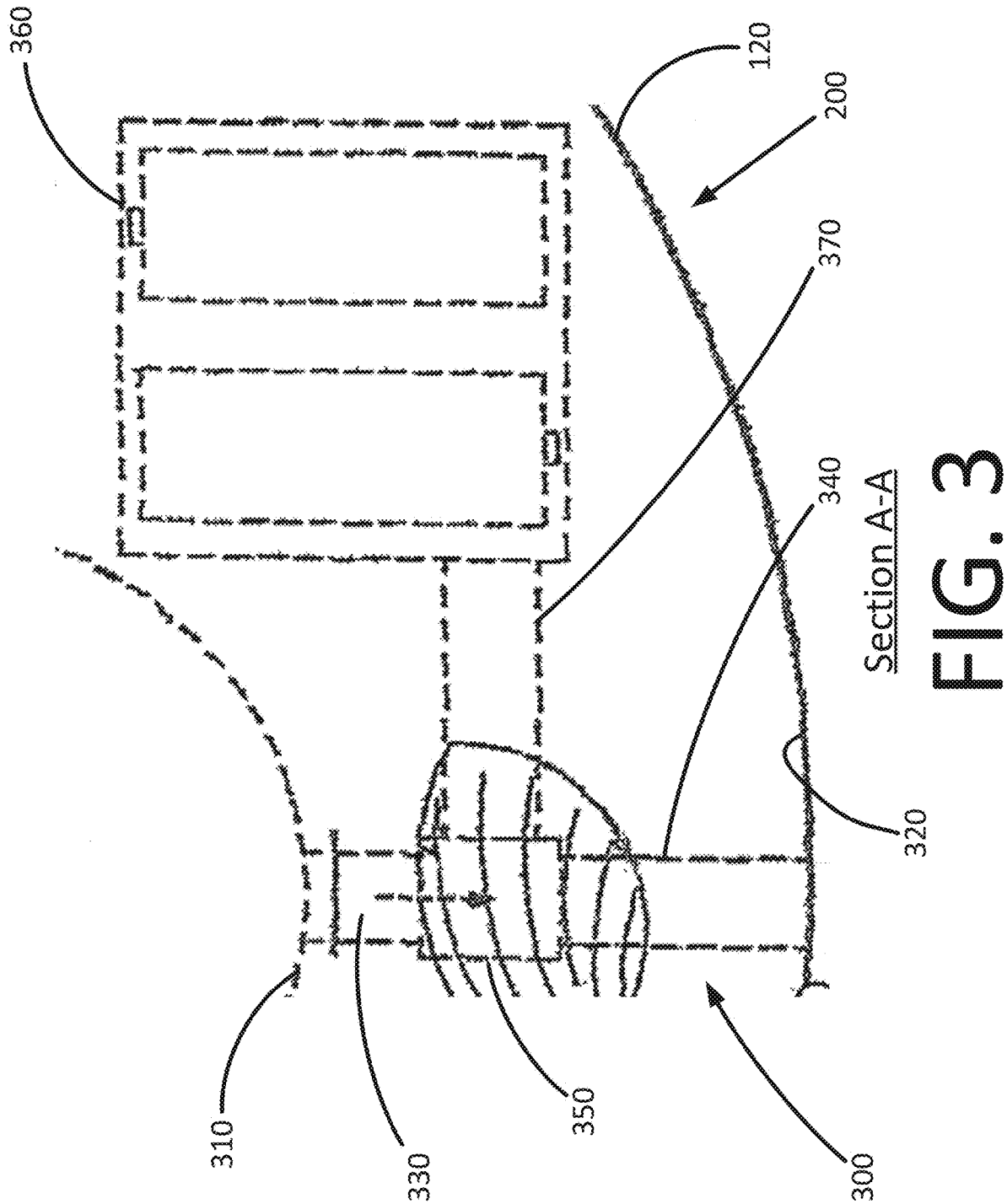
FIG. 3 is a perspective, partially broken away view of section A-A from FIG. 2 in an illustrative automatic fish feeder.

The feeding track 300 and food storage reservoir 310 can be assembled as shown in FIG. 3 to transport food from the food storage reservoir 310 to outside of the housing 120. The feeding track 300 can be coupleable to the food storage reservoir 310. The feeding track 300 can be configured to receive food from the food storage reservoir 310 at individual rates. The feeding track 300 can extend from the food storage reservoir 310 to at least the inner surface 320 of the peripheral outer cover 200. Some embodiments of the fish feeder can have a feeding track 300 that extends beyond the peripheral outer cover 200 and is adjustable to extend to different parts of the aquarium. The feeding track 300 can comprise an inner tube aperture 330 that can be at least partially surrounded by an outer wall 340. Any of the food storage reservoir 310, housing, and feeding track 300 can be separately or integrally manufactured to one another.

The feeding track 300 can be supported and held in position by components within the housing. In some embodiments, the automatic fish feeder can include a feeding track support (not shown) with at least one saddle portion and a stem. The stem can be connected to the saddle portion. The at least one saddle portion can be configured to couple to the feeding track 300. The stem can be affixed to the inner surface 320 of the peripheral outer cover 200. The feeding track support can be removable, e.g., for assembly, maintenance, installation, and the like.

The feeding track 300 can be configured to distribute food from the food storage reservoir at individual rates. A valve 350 can be coupleable to the feeding track 300 and be configured to control the flow of food from the feeding track 300. The feeding track 300 may have additional components, e.g., a secondary valve, to manually control the flow of food. The valve 350 can be preferably positioned within the housing, but may be positioned outside of the housing. The valve 350 can include a counter 360 and a rod 370. In some embodiments, the rod 370 can extend through the outer wall 340 of the feeding track 300. The rod 370 can enter the feeding track 300 using a feeding track hole (not shown).

The rod 370 can be configured to not exit the feeding track 300 through the feeding track hole once assembled. In many embodiments, the rod 370 can have a rod diameter. In some embodiments, the feeding track hole can have a first diameter. In some embodiments, at least a portion of the rod 370 can be surrounded by a sleeve (not shown) for at least a portion of where the rod intersects with the inner tube aperture. The sleeve can have an inner sleeve diameter and an outer sleeve diameter. In some embodiments, the inner sleeve diameter is about the same size as the rod diameter. Some embodiments of the fish feeder can have the outer sleeve diameter be larger than the first diameter of the feeding track hole.

The counter 360 can be configured to move the rod 370 relative to the feeding track. The rod 370 can be connected to the counter 360. The rod 370370 can be connected to the feeding track. The rod 370370 can at least partially extend through the outer wall 340 of the feeding track 300. The counter 360 can move the rod 370 at predetermined intervals. In some embodiments, the rod 370 can substantially span the inner tube aperture 330 of the feeding track 300. In some embodiments, the rod 370 can move between a first rod position to a second rod position. The first and second rod positions can be, for example, in the axial direction or in the rotational direction in relation to the rod 370.

Movement of the rod 370 can control the flow of food in the feeding track 300. In the first rod position, food can be prevented from traveling along the feeding track 300 by the rod 370. For example, the rod 370 can span the width of the inner aperture 330 of the feeding track 300 to at least substantially cover the cross sectional area of the inner aperture 330. As the rod 370 moves from the first rod position to the second rod position, the amount of the cross sectional area covered by the rod 370 can decrease. In the second rod position food may not be prevented from traveling along the feeding track by the rod 370.

An axial biasing member (not shown) in many embodiments can assist in moving the rod 370. In some embodiments, the valve 350 further comprises an axial biasing member (e.g., a spring) connected to either or both of the counter 360 and the rod 370. In some instances, the rod may be a push rod or can be composed of metal (e.g., steel). For example, the counter 360 can draw the rod 370 back against the tension of the axial biasing member to where the rod 370 can be in the second rod position at the predetermined interval. In such embodiments, the counter 360 can release the rod 370 to move the rod 370 to the first rod position. That is, the compression of the axial biasing member while in the second rod position can be released thereby forcing the rod 370 to move towards the first rod position.

In some embodiments, the valve 350 can include a feeding track inner cover (not shown) to control the flow of food through the feeding track 300. The automatic fish feeder can include a circular feeding track inner cover. The feeding track inner cover can be configured to rotate within the feeding track 300. For instance, the inner track cover can be integral with the rod 370 or separately attached. In some embodiments, the rod 370 can be configured to rotate the inner cover. In many embodiments the rod 370 can be coupled to the feeding track inner cover. For example, the feeding track inner cover can be just out of contact with the feeding track outer wall 340 at substantially all rotational positions.

The inner cover can be moved between a first cover position to a second cover position. In the first cover position, food can prevented from traveling along the feeding track by the inner cover. In the second cover position, food may not be prevented from traveling along the feeding track by the inner cover. A torsional biasing member (e.g., a torsional spring) can assist the rod 370 in moving the inner cover between the first and second cover position.

Figure 4:
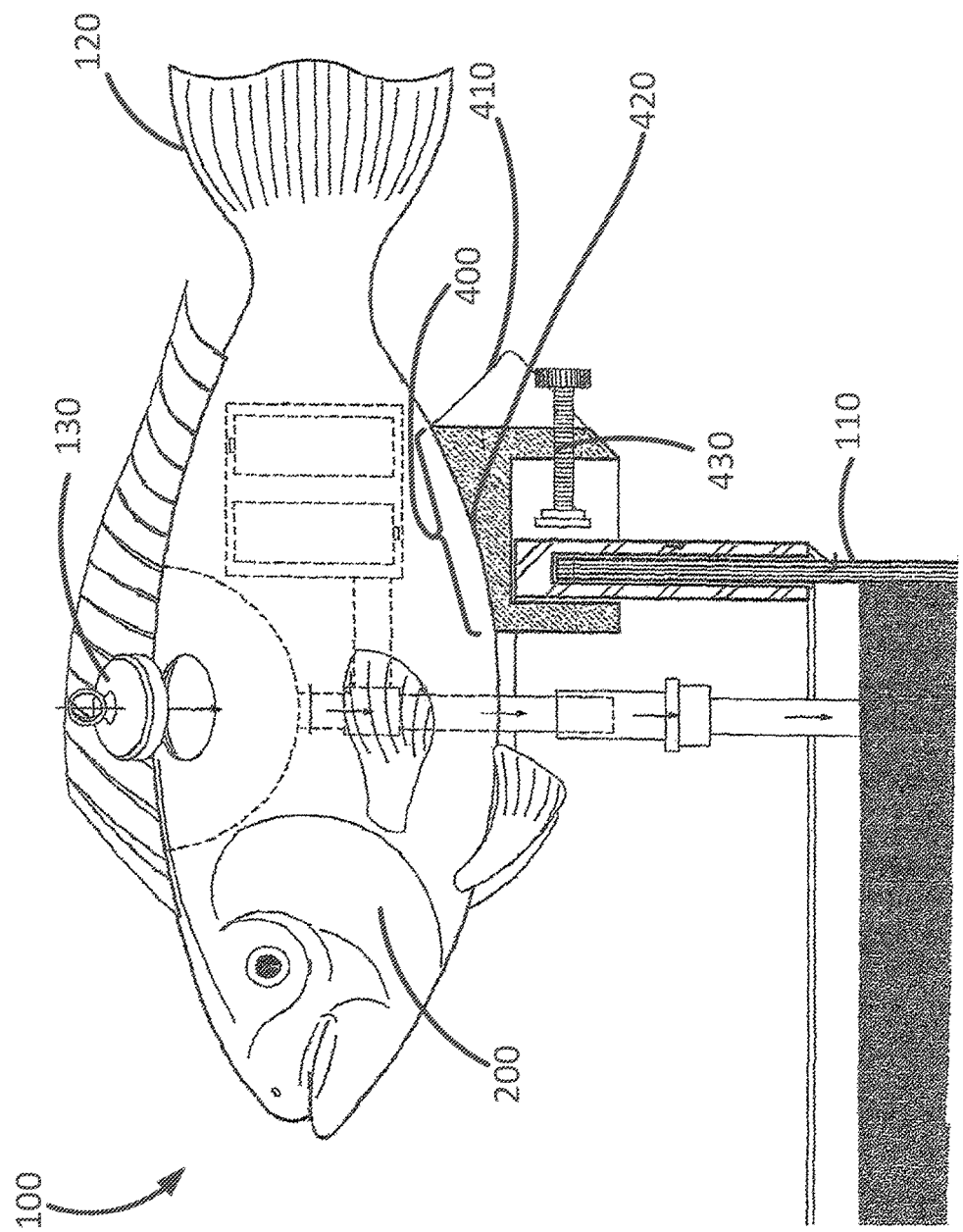
FIG. 4 is a perspective, partially broken away view of an illustrative automatic fish feeder attached to an aquarium.

Certain features of the housing 120 can assist in positioning the fish feeder 100 for operation as shown in FIG. 4. In some embodiments, the peripheral outer cover 200 of the housing 120 includes at least one seating portion 400. In some embodiments, the seating portion 400 of the peripheral outer cover is fixedly attached to an aquarium 110. The fish feeder 100 can, in some instances, be suspended from a higher position using the seating portion 400. For example, rope can be suspended from the sealing to the seating portion 400 of the peripheral outer cover 200.

Many embodiments of the automatic fish feeder 100 can include an adjuster 410. In some embodiments, the seating portion 400 of the peripheral outer cover 200 is fixedly attached to an aquarium 110 using an adjuster 410. The adjuster 410 can feature padding or grips (not shown) so as to accommodate the fish feeder 100 and the aquarium 110 with little abrasion. In some embodiments, the adjuster 410 can be integrally affixed to the housing 120.

In some embodiments, the adjuster 410 can include an adjuster seat 420. The adjuster seat 420 can have a profile that complements a profile of the seating portion 400. The adjuster seat 420 can be coupled to the seating portion 400 of the peripheral outer cover 200. In many embodiments, the adjuster 410 includes an adjuster clamp 430. The adjuster clamp 430 can be configured to couple to a wall of an aquarium 110.

Figure 5:
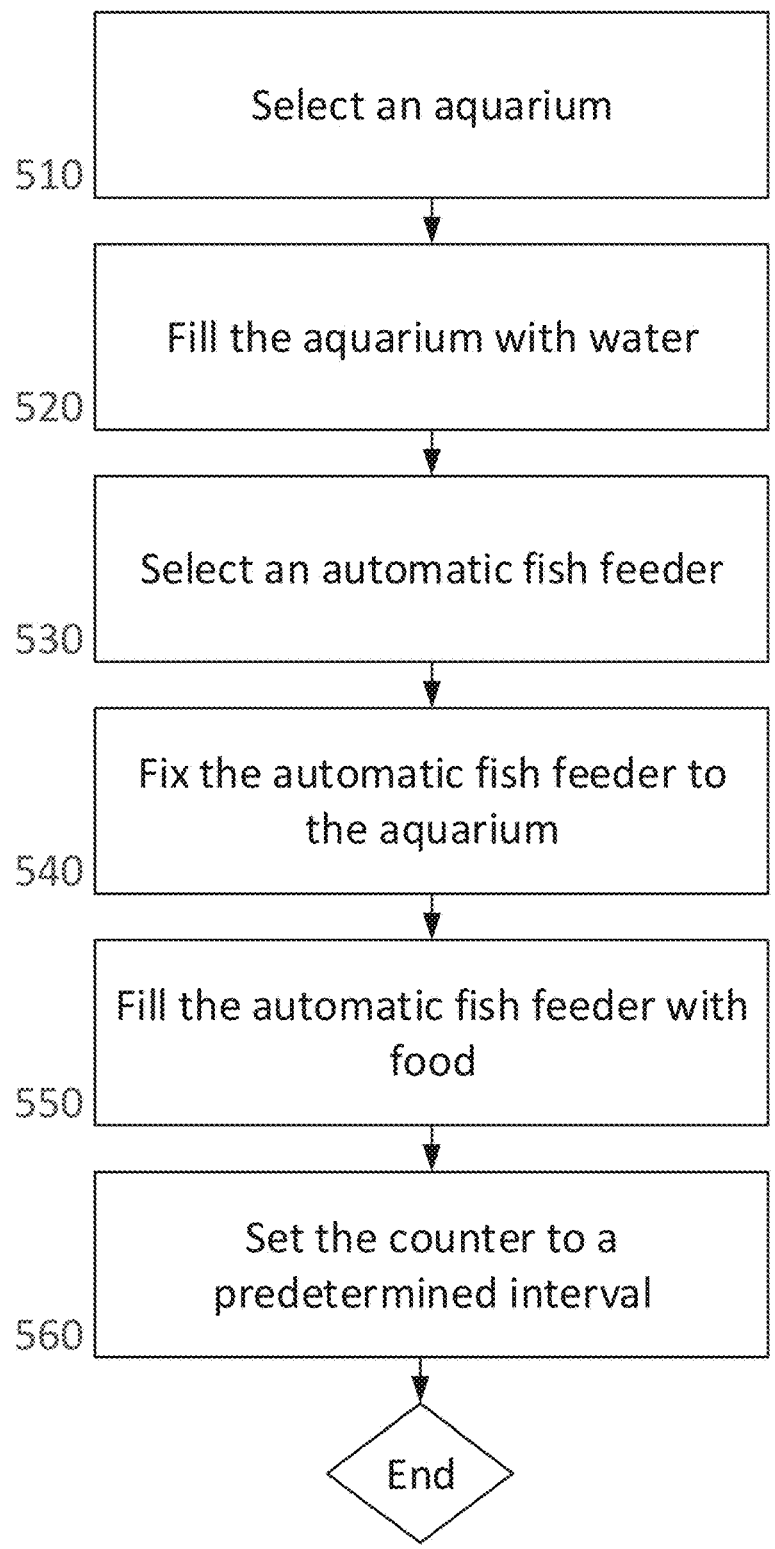
FIG. 5 is a diagram of an illustrative method for automatically feeding fish.

Fish can be fed at predetermined intervals using an illustrative method shown in FIG. 5. A method of automatically feeding fish can include providing an aquarium 510. The method can including filling an aquarium with water 520. The method can include providing an automatic fish feeder as those discussed herein 530. The method can include fixing the automatic fish feeder to an aquarium 540. The method can include filling the food storage reservoir with fish food 550. The method can include setting the counter to a predetermined interval 560 to move the rod between a first rod position in which food is prevented from traveling along the feeding track by the rod and a second rod position in which food is not prevented from traveling along the feeding track by the rod.

In some embodiments, the method can include setting the counter includes selecting a period of time between when the counter moves the rod. A user may access the valve by removing a cover from the housing and setting the valve. For instance, the valve can include a dial or digital interface to set the desired intervals. Additionally, the valve may include wireless methods for setting and controlling the valve, e.g., by using BLUETOOTH. The fish feeder may be powered via battery or solar power as well as through wired power sources.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An automatic fish feeder comprising:
   a housing including a peripheral outer cover defining at least one access hole in the peripheral outer cover and having an inner surface and an outer surface;
   a food storage reservoir coupled to the housing, the food storage reservoir being configured to store food and to be accessible to an outside by a first access hole of the at least one access hole in the peripheral outer cover of the housing;
   at least one cover removably attached to the peripheral outer cover of the housing, a first cover of the at least one cover being configured to substantially seal the first access hole of the food storage reservoir;
   a feeding track including an outer wall defining an inner aperture at least partially surrounded by the outer wall, the feeding track being configured to receive and distribute food from the food storage reservoir through the inner aperture; and
   a valve coupled to the feeding track, the valve being configured to control a flow of food through the feeding track by covering and uncovering a portion of the inner aperture, the valve containing:
   a counter and
   a rod coupled to the counter and the feeding track; and
   wherein the counter is configured to move, at predetermined intervals, the rod relative to the feeding track.

2. The automatic fish feeder of claim 1 wherein the peripheral outer cover of the housing comprises at least one seating portion.

3. The automatic fish feeder of claim 2 wherein a first seating portion of the at least one seating portion of the peripheral outer cover is fixedly attached to an aquarium.

4. The automatic fish feeder of claim 3 wherein the first seating portion of the peripheral outer cover is fixedly attached to the aquarium using an adjuster.

5. The automatic fish feeder of claim 4 wherein the adjuster comprises an adjuster seat coupled to the seating portion of the peripheral outer cover and an adjuster clamp configured to couple to a wall of the aquarium.

6. The automatic fish feeder of claim 1 wherein the counter is configured to move the rod between the first rod position and the second rod position by axial movement of the rod relative to the feeding track.

7. The automatic fish feeder of claim 1 wherein the rod substantially spans the inner surface of the feeding track.

8. The automatic fish feeder of claim 1 wherein the rod has a rod diameter and extends through the outer wall of the feeding track using a feeding track hole in the outer wall, the feeding track hole having a first diameter,
   wherein at least a portion of the rod where the rod intersects with the inner aperture is surrounded by a sleeve, the sleeve having an inner sleeve diameter and an outer sleeve diameter, and
   wherein the inner sleeve diameter is about the same size as the rod diameter and the outer sleeve diameter is larger than the first diameter of the feeding track hole.

9. The automatic fish feeder of claim 1 further comprising a feeding track inner cover configured to rotate within the feeding track.

10. The automatic fish feeder of claim 9 wherein the rod is coupled to the feeding track inner cover and is configured to rotate the feeding track inner cover between a first cover position that corresponds to the first rod position to a second cover position that corresponds to the second rod position.

11. The automatic fish feeder of claim 1 wherein the housing has an outer profile in a shape of a fish.

12. The automatic fish feeder of claim 1 further comprising at least one feeding track support having at least one saddle portion configured to couple to the feeding track and a stem extending from the saddle portion and being affixed to the inner surface of the peripheral outer cover.

13. The automatic fish feeder of claim 1 wherein the valve further comprises an axial biasing member connected to the counter and the rod.

14. The automatic fish feeder of claim 1 wherein the automatic fish feeder further comprises an adjuster for fixing the automatic fish feeder to an aquarium, the adjuster being integrally affixed to the housing.

15. The automatic fish feeder of claim 1,
wherein the counter is configured to move, at predetermined intervals, the rod relative to the feeding track between a first rod position in which food is prevented from flowing through the feeding track and a second rod position in which food is allowed to flow through the feeding track and
wherein movement of the rod between the first and second rod positions at a predetermined interval corresponds to an amount of food distributed from the feeding track.

16. A method of automatically feeding animals in an aquarium, the method comprising:
selecting the aquarium;
selecting an automatic feeder comprising:
a housing including a peripheral outer cover defining at least one access hole in the peripheral outer cover and having an inner surface and an outer surface;
a food storage reservoir coupled to the housing, the food storage reservoir being configured to store food and to be accessible to an outside by a first access hole of the at least one access hole in the peripheral outer cover of the housing;
at least one cover removably attached to the peripheral outer cover of the housing, a first cover of the at least one cover being configured to substantially seal the first access hole of the food storage reservoir;
a feeding track including an outer wall defining an inner aperture at least partially surrounded by the outer wall, the feeding track being configured to receive and distribute food from the food storage reservoir through the inner aperture;
and a valve coupled to the feeding track, the valve being configured to control a flow of food through the feeding track, the valve containing:
a counter and a coupled to the counter and the feeding track; and
wherein the counter is configured to move, at predetermined intervals, the rod relative to the feeding track, between a first rod position in which food is prevented from flowing through the feeding track and a second rod position in which food is allowed to flow through the feeding track, such that movement of the rod between the first and second rod positions at a predetermined interval corresponding to an amount of food distributed from the feeding track;
positioning the automatic feeder relative to the aquarium such that food distributed from the automatic feeder is transferred into the aquarium;
filling the food storage reservoir with food; and
setting the counter to a predetermined interval to move the rod between the first rod position and the second rod position.

17. The method of claim 16 wherein the housing of the automatic feeder further comprises a seating portion and wherein positioning the automatic feeder relative to the aquarium comprises using an adjuster having an adjuster seat coupled to the seating portion of the peripheral outer cover and an adjuster clamp configured to couple to a wall of the aquarium.

18. The method of claim 16 wherein the automatic feeder further comprises an adjuster integrally affixed to the housing the adjuster being configured to fix the automatic feeder to the aquarium.

19. The method of claim 16 wherein setting the counter to a predetermined interval includes selecting a period of time between when the counter moves the rod.

20. An aquarium for automatically feeding fish, the aquarium comprising:
an aquarium configured to hold water to be inhabited by fish and
an automatic feeder configured to be positioned above a water level of the aquarium, the automatic feeder comprising:
a housing including a peripheral outer cover defining at least one access hole in the peripheral outer cover and having an inner surface and an outer surface;
a food storage reservoir coupled to the housing, the food storage reservoir being configured to store food and to be accessible to an outside by a first access hole of the at least one access hole in the peripheral outer cover of the housing;
at least one cover removably attached to the peripheral outer cover of the housing, a first cover of the at least one cover being configured to substantially seal the first access hole of the food storage reservoir;
a feeding track including an outer wall defining an inner aperture at least partially surrounded by the outer wall, the feeding track being configured to receive and distribute food from the food storage reservoir through the inner aperture; and
a valve coupled to the feeding track, the valve being configured to control a flow of food through the feeding track by covering and uncovering a portion of the inner aperture, the valve containing a counter and a rod coupled to the counter and the feeding track; and
wherein the counter is configured to move, at predetermined intervals, the rod relative to the feeding track.

* * * * *